United States Patent
Moon et al.

(10) Patent No.: US 11,156,901 B2
(45) Date of Patent: Oct. 26, 2021

(54) LIGHT SHIELD SHUTTERS FOR CAMERAS

(71) Applicant: HEWLETT-PACKARD DEVELOPMENT COMPANY, L.P., Spring, TX (US)

(72) Inventors: Tony Moon, Houston, TX (US); Alan Man Pan Tam, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 634 days.

(21) Appl. No.: 16/076,491

(22) PCT Filed: Jul. 6, 2017

(86) PCT No.: PCT/US2017/040788
§ 371 (c)(1),
(2) Date: Aug. 8, 2018

(87) PCT Pub. No.: WO2019/009894
PCT Pub. Date: Jan. 10, 2019

(65) Prior Publication Data
US 2021/0181597 A1    Jun. 17, 2021

(51) Int. Cl.
*G03B 11/04* (2021.01)
*H04N 5/225* (2006.01)
*G03B 30/00* (2021.01)

(52) U.S. Cl.
CPC .......... *G03B 11/045* (2013.01); *G03B 11/041* (2013.01); *H04N 5/2254* (2013.01); *H04N 5/2256* (2013.01); *G03B 30/00* (2021.01)

(58) Field of Classification Search
CPC ............................ G03B 11/041; G03B 11/045; G03B 2215/05; G03B 2215/0503; G03B 2215/0567; G03B 30/00; G03B 2217/24; G03B 2217/242; H04N 5/2256; H04N 5/2254
See application file for complete search history.

(56) References Cited

U.S. PATENT DOCUMENTS 4,276,650 A * 6/1981 de Jager ............... H04L 7/0066
                                                                 375/359
4,313,657 A * 2/1982 Tokutomi ............... G03B 17/20
                                                                 396/147
(Continued)

FOREIGN PATENT DOCUMENTS

CN        101963826 A      2/2011
CN        205407997 U      7/2016
(Continued)

OTHER PUBLICATIONS

Truong K.N., Patel S.N., Summet J.W., Abowd G.D. (2005) Preventing Camera Recording by Designing a Capture-Resistant Environment. In: Beigl M., Intille S., Rekimoto J., Tokuda H. (eds) UbiComp 2005: . UbiComp 2005. Lecture Notes in Computer Science, vol. 3660. Springer, Berlin, https://doi.org/10.1007/11551201_5.*

(Continued)

*Primary Examiner* — Christopher E Mahoney
(74) *Attorney, Agent, or Firm* — Trop, Pruner & Hu P.C.

(57) ABSTRACT

A technique includes mounting a light source on an electronic device and disabling a camera of the electronic device. Disabling the camera includes activating the light source to shutter the camera.

20 Claims, 9 Drawing Sheets

(56) References Cited

U.S. PATENT DOCUMENTS

| | | |
|---|---|---|
| 8,988,532 B2 | 3/2015 | Soffer |
| 9,083,937 B1 | 7/2015 | Oliphant |
| 9,124,762 B2 | 9/2015 | Cutler et al. |
| 9,179,058 B1 | 11/2015 | Zeira et al. |
| 2015/0035028 A1 | 2/2015 | Fan et al. |
| 2017/0034442 A1 | 2/2017 | Kim et al. |
| 2017/0242320 A1* | 8/2017 | Matsuoka ............ G03B 11/045 |
| 2018/0359403 A1* | 12/2018 | Zhang ................... H04N 5/3532 |
| 2019/0166300 A1* | 5/2019 | Bunker .............. H04N 5/23241 |

FOREIGN PATENT DOCUMENTS

| | | |
|---|---|---|
| DE | 2100739 A1 | 7/1971 |
| JP | 2000250095 A | 9/2000 |

OTHER PUBLICATIONS

Smelkov, "Evaluation of the Recovery Time of the Television Camera CCD Sensor After Exposure to Light Overload", Retrieved from Internet—http://bnti.ru/showart.asp?aid=637&lvi, 2006, 3 Pages, Translation of CMeJIKOB B.M. Oueffica Bpemem BOC-CTBHOBBeH1451 TeBe13113BOHHOrl xamepu Ha n3c-maTpHue Hoene B03, BerICTBHA CBCTOBOR neperpy3lcH. Biopo HayilHo-TexHwiecxoil HH49opmaium. TexHium BAB cneuc. nyx, 2006, 3 pages.

"How to Blind a Surveillance Camera", WikiHow, Retrieved from internet—https://www.wikihow.com/Blind-a-Surveillance-Camera, 2015, 3 Pages.

* cited by examiner

LIGHT SHIELD SHUTTERS FOR CAMERAS

BACKGROUND

Electronic devices that include cameras, such as cellular telephones, tablet computers, watches, monitors, web cameras, and so forth, may potentially expose users of the electronic devices to unauthorized observation, or spying. For example, an electronic device may have a camera and a network interface through which a remote hacker may access the camera and view images of the electronic device's surrounding environment without a user of the electronic device being aware of this activity.

DETAILED DESCRIPTION

An electronic device that has a camera may have features to prevent the camera from being used to spy on the electronic device's environment. For example, the electronic device may have a software-based shutter, which may be activated to prevent the electronic device from processing images that are acquired by the camera. However, a software-based shutter may be prone to hacking, and as such, a user of the electronic device may be unaware that the shutter has been deactivated. As another example, the electronic device may have a camera activity indicator light for purposes of visually indicating that the camera is active. However, control of this light may also be hacked to turn off the light.

In accordance with example implementations that are described herein, an electronic device has a light shield shutter for its camera. In this context, a "light shield shutter" refers to a mechanism or component that may be activated (i.e., turned on or enabled) to form a light-based shield (i.e., a barrier, cover or curtain formed at least in part from light) to control the ability of the camera to acquire images of the camera's environment. As described herein, the light-based shield intentionally distorts or obscures images that are acquired by an imager of the camera. Therefore, while the light shield shutter is active, if the electronic device is subject to a security attack (the electronic device is hacked, brought under the control due to execution of malware, and so forth), images acquired by the camera are distorted or obscured, thereby effectively preventing unauthorized operation or use of the camera.

Moreover, in accordance with example implementations, the operation of the light shield shutter may be independent of an operating system (OS) of the electronic device, thereby providing an additional security barrier to unauthorized camera use. Additionally, in accordance with example implementations, the shielding light that is produced by the light shield shutter is visible outside of the electronic device, thereby providing a visual indicator of the state (activated or deactivated) of the shutter.

Figure 1:
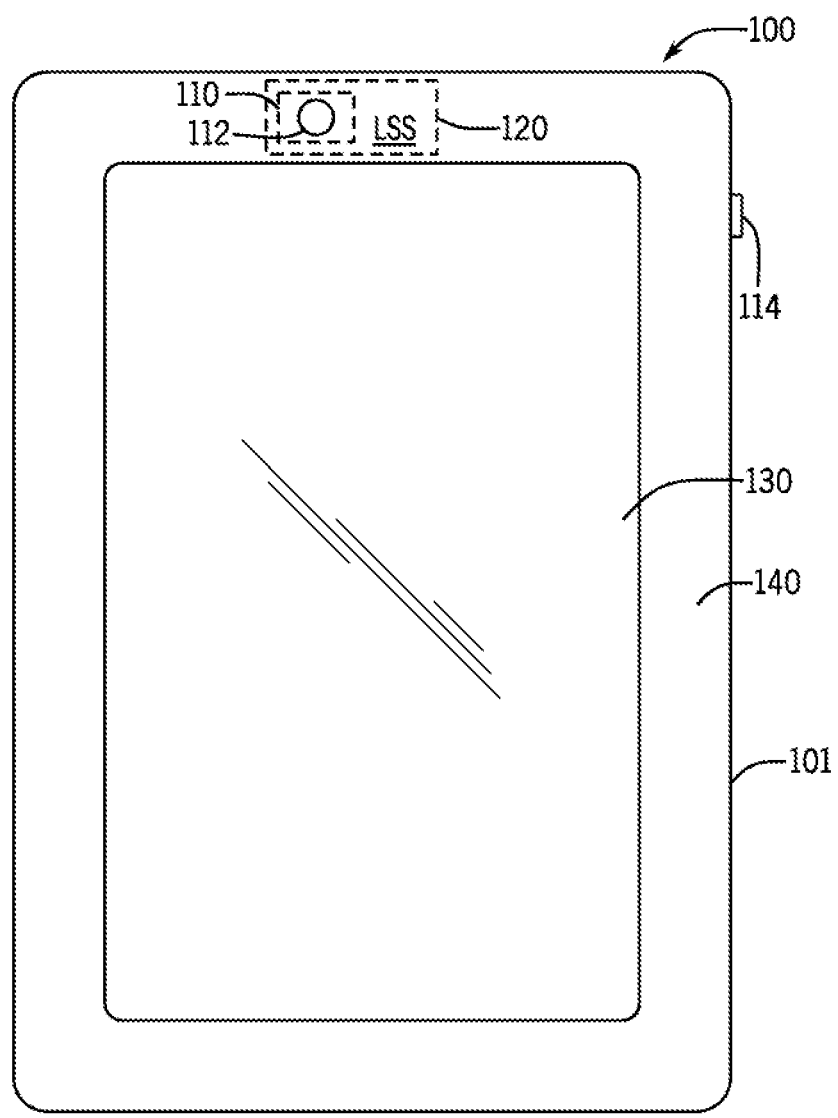
FIG. 1 is a front view of an electronic device that includes a camera and a light shield shutter for the camera according to an example implementation.

As a more specific example, FIG. 1 depicts an electronic device 100, a tablet computer, in accordance with example implementations. The electronic device 100 includes a camera 110 and a light shield shutter 120 for the camera 110. The electronic device 100 may be an electronic device other than a tablet computer, in accordance with further example implementations. For example, in accordance with some implementations, the electronic device may be a wearable electronic device, such as a watch, or a portable electronic device, such as a cellular telephone or a notebook computer. As other examples, the electronic device may be a relatively non-portable electronic device, such as a desktop computer, or a stand-alone display, or monitor. Depending on the particular implementation, the electronic device may include a central processing unit (CPU), i.e., the electronic device may be a processor-based device; or the electronic device may contain hardware that does not include a CPU. As further examples, the electronic device may be a web camera, a drone or a toy.

For the example implementation of FIG. 1, the camera 110 and the light shield shutter 120 are disposed within a housing 101 of the electronic device 100. In accordance with example implementations, the housing 101 includes a display window screen 130 (a touch screen or a non-touch screen, as examples), which may or may not be surrounded on its peripheral region by a bezel 140 (i.e., an outer frame for the screen 130). The bezel 140 includes an aperture, or opening 112 (called a "lens opening 112" herein), for a lens of the camera 110; and in accordance with example implementations, when the light shield shutter 120 is activated, the shutter 120 forms a light barrier, which prevents or at least inhibits the camera 110 from acquiring images within the field of view of the camera 110.

In this manner, for a non-privacy mode of operation (when the light shield shutter 120 is deactivated, or turned off), the optics of the camera 110 focuses images within the camera's field of view onto the camera's imager, so that the imager may electrically capture digital representation of the images. The field of view may be set by optics of the camera 110 (set by a focal length of a lens of the camera 110, for example). When the electronic device transitions to a privacy mode of operation, the light shield shutter 120 is activated; and in this mode of operation, the resulting light barrier inhibits, if not prevents, the imager from acquiring images within the camera's field of view.

As described herein, the light shield shutter 120 may take on many different forms, depending on the particular implementation. For example, in accordance with some implementations, the light shield shutter 120 contains a light source that produces light that partially or fully overlaps the field of view of the camera 110. In this manner, the light shield 120 may contain a light source that is oriented to generate light that passes behind or in front of the lens of the camera 110 (i.e., passes between the lens and the imager and passes through the lens). Moreover, as described herein, in accordance with example implementations, the light from the light source may be guided by alight pipe, or diffuser.

The light that is produced by the light source, in accordance with example implementations, saturates the imager of the camera. In this manner, in accordance with example implementations, the pixel sensors of the imager acquire pixel intensity values that represent sensed primary color components (red, green and blue components, for example) associated with different corresponding parts of an image. In this context, saturating the imager means that light from the light source dominates the image that is captured by the imager to thereby inhibit the acquisition of images from within the camera's field of view. In accordance with example implementations, the light from the light shield shutter causes most of the pixel sensors of the imager to acquire intensities that are at least seventy percent of the maximum intensity that may be sensed by the pixel sensors.

Figure 2A:
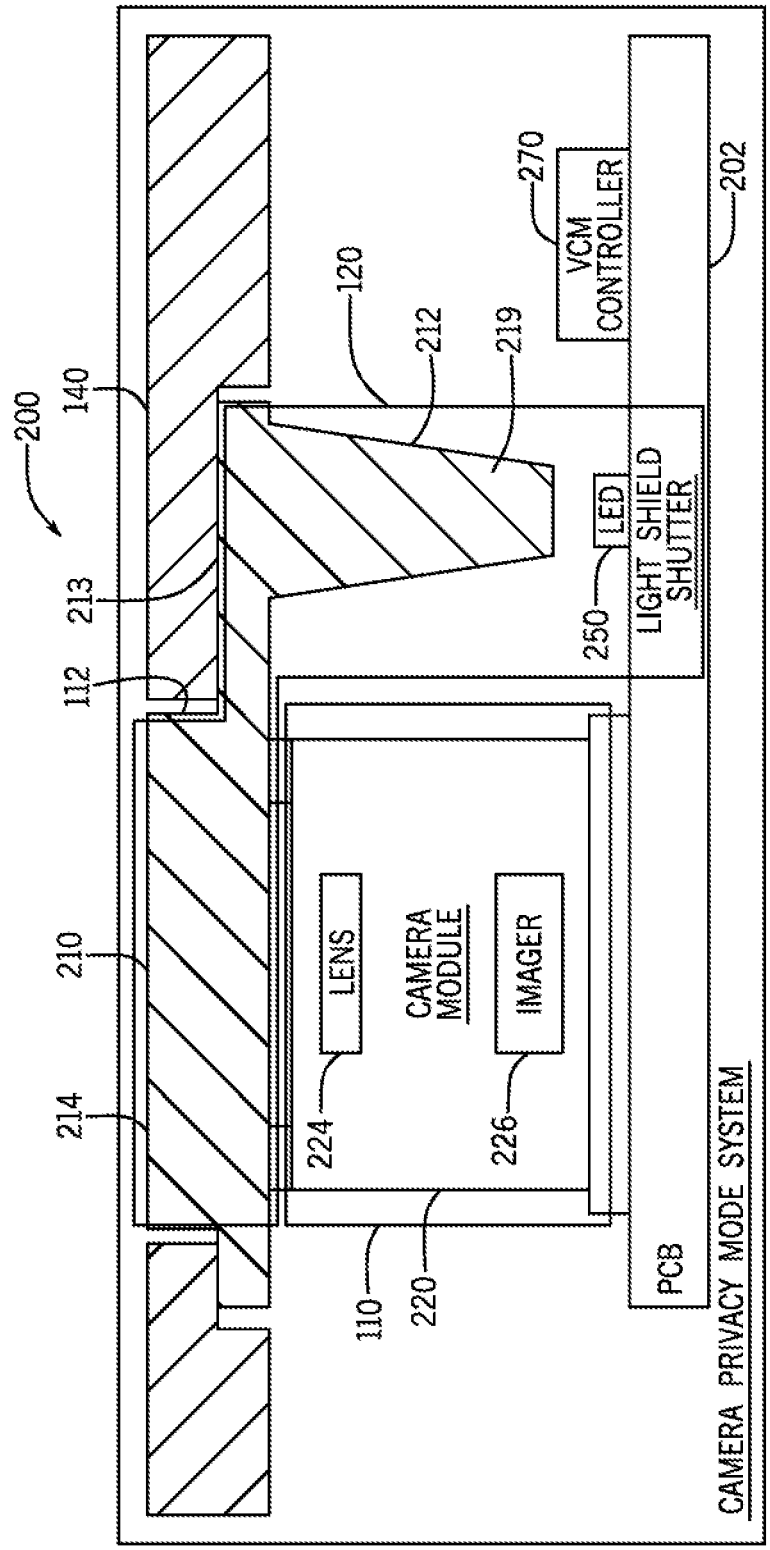
FIG. 2A is a schematic view of a camera privacy mode system of the electronic device of FIG. 1 in a non-privacy mode of operation in which the light shield shutter is deactivated according to an example implementation.

Referring to FIG. 2A, as a more specific example, in accordance with some implementations, the camera 110 and the light shield shutter 120 may be part of a camera privacy mode system 200 of the electronic device 100. The light shield shutter 120 may include one or multiple light sources, such as one or more light emitting diodes (LEDs) 250 (one LED 250 being depicted in FIG. 2A); and the camera 110 may include a camera module 220. The camera module 220 is a discrete package that contains an imager sensor, or imager 226; optics, including a lens 224; and various other components, such as a voice coil motor (VCM, not shown) to focus the camera 110 by charging the focal length of the lens 224. The LED 250, a VCM controller 270 and the camera module 220 may be mechanically and electrically mounted to a printed circuit board (PCB) 202.

In accordance with some implementations, the electronic device 100 may include a light diffuser, or light pipe 210, for purposes of directing, or guiding light from the LED 250 so that the light passes through the lens 224 to the imager 226. In this manner, the light pipe 210, in general, refers to a structure, or optical guide, for directing, or guiding light. For the camera privacy mode system of FIG. 2A, the light pipe 210 is mounted to an interior surface 213 of the bezel 140 and includes a first portion 212 that extends orthogonally away from the bezel 140 so that an end 219 of the portion 212 is suspended above the LED 250 to received light emitted by the LED 250. The light pipe 210, in accordance with example implementations, further includes a second portion 214, which is integral with the first portion 212 and extends over the lens 224 between the lens 224 and the lens opening 112, which, for this implementation is formed in the bezel 140.

During the non-privacy mode of operation, the light shield shutter 120 is turned off, or deactivated, as depicted in FIG. 2A. When the light shield shutter 120 is deactivated, the LED 250 is turned off, and the second portion 214 of the light pipe 210 is optically transparent, which allows ambient light to pass through the lens 224 and allows the camera 110 to acquire images within its field of view.

Figure 2B:
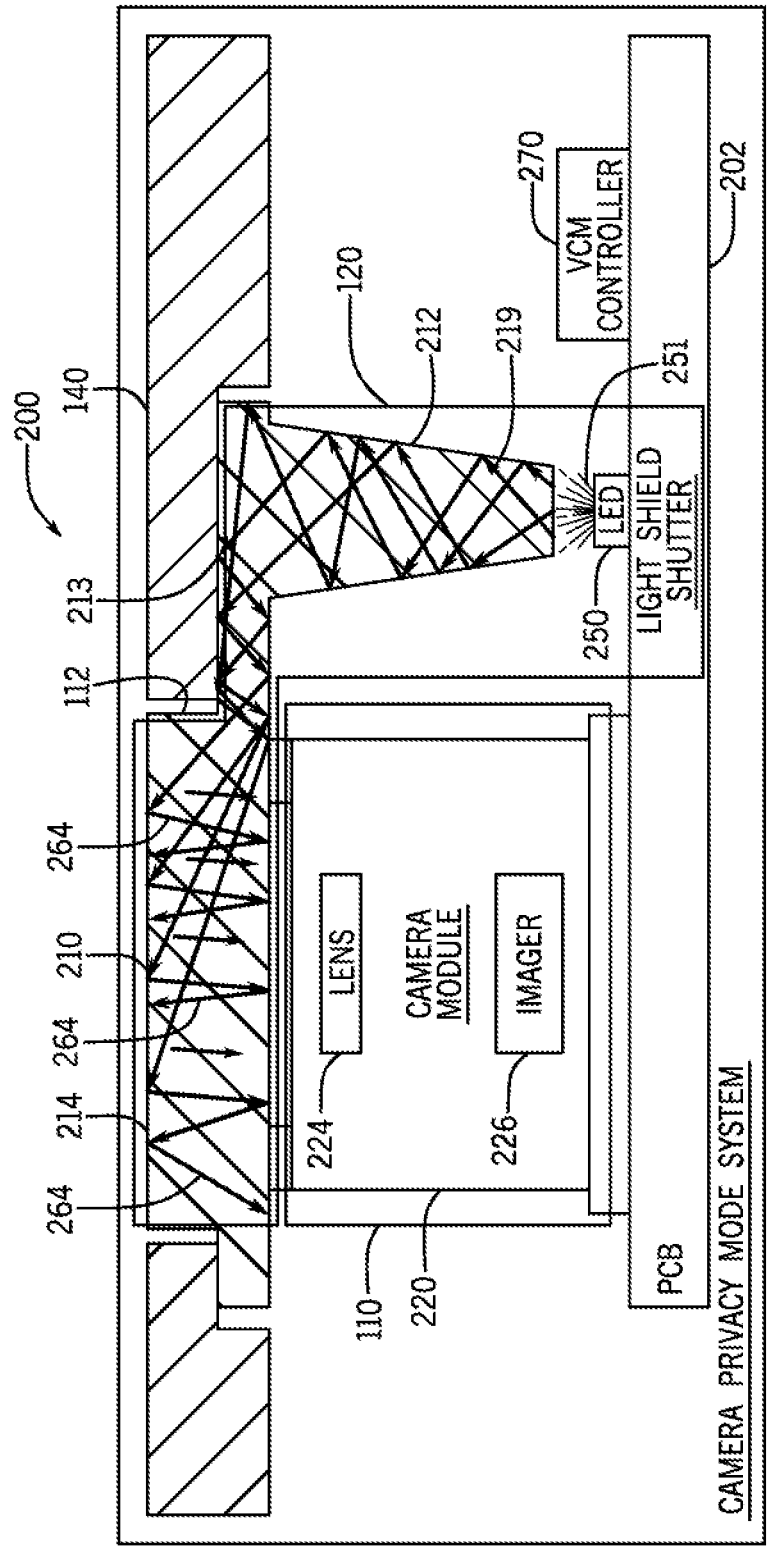
FIG. 2B is a schematic view of the camera privacy mode system in a privacy mode of operation in which the light shield shutter is activated according to an example implementation.

FIG. 2B depicts the camera privacy mode system 200 in a privacy mode of operation in which the light shield shutter 120 is activated, or turned on, in accordance with example implementations. For this mode of operation, the LED 250 is turned on to produce light 251, which enters the end 219 of the light pipe 210. The light pipe 210 diffuses the light (as depicted by arrows 264), and the diffused light in the second portion 214 of the light pipe 210 forms a light barrier above the lens 224 to prevent the camera 110 from acquiring images from its field of view. In this manner, for the privacy mode of operation, the imager 226 primarily captures an image of the diffused light.

Figure 3:
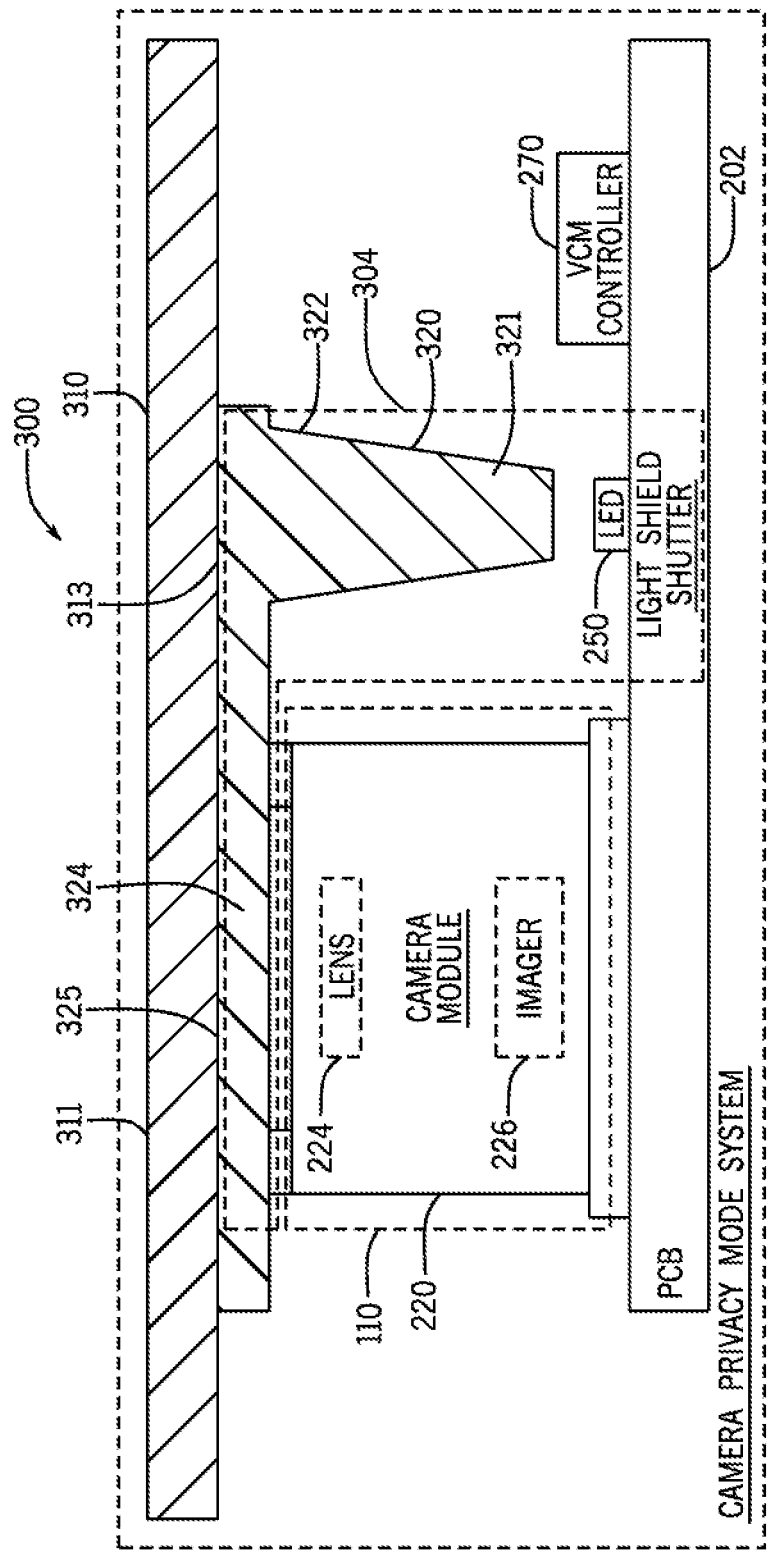
FIG. 3 is a schematic view of a camera privacy mode system according to a further example implementation.

FIG. 3 depicts a camera privacy mode system 300 for an electronic device according to a further example implementation. For this example implementation, the electronic device has a glass display screen 310 (a touch screen, for example) in place of the display screen 130 and bezel 140 of FIG. 1; and the display screen 310 includes a region 311 that extends over the lens 224 to form the lens opening for the camera. The camera mode privacy includes a light shield shutter 304 that includes a light pipe 320 that has a first portion 322, which has an end 321 near the LED 250 to guide the light from the LED 260. The light pipe 320 also includes a second portion 324 that is integral with the first portion and extends over the lens 224. Unlike the light shield shutter of FIG. 2A, for the light shield shutter 304, the second portion 324 is mounted to (laminated to, for example) an inner surface 325 of the display screen 310.

The camera privacy mode systems 200 and 300 provide visual indications of the activation/deactivation states of their light shield shutters. In this manner, when the light shield shutter 120 of the camera privacy mode system is activated (as depicted in FIG. 2B), the diffused light is visible in the lens opening 112 (i.e., the lens opening appears opaque), and when the light shield shutter 120 is deactivated, the lens opening 112 is transparent. In a similar manner, the light shield shutter 304 (FIG. 3) provides a visual indication of its activation/deactivation status in that the region 311 (i.e., the lens opening) appears either transparent (i.e., the light shield shutter 304 is deactivated) or opaque (i.e., the light shield shutter 304 is activated).

Figure 4:
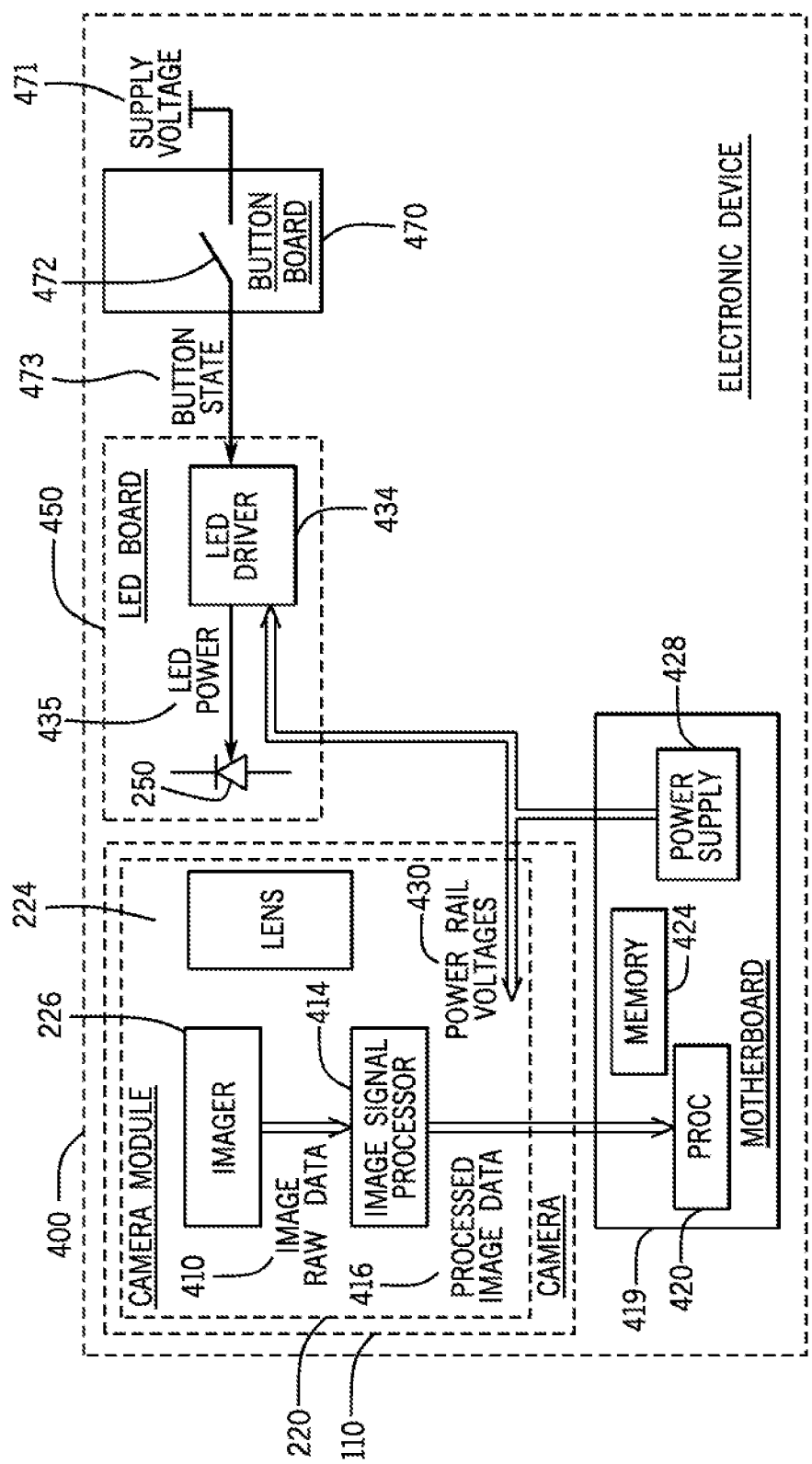
FIG. 4 is an electrical schematic diagram of the electronic device according to an example implementation.

In accordance with some implementations, the electronic device may have an electrical architecture 400 that is depicted in FIG. 4. As depicted in FIG. 4, the camera module 220 may include an image signal processor 414 that processes raw image data 410 that is acquired by the imager 226 and provides processed image data 416 to a main processing board, such as a motherboard 419. The motherboard 419 may include one or multiple processors 420 (one or multiple central processing units (CPUs), one or multiple CPU processing cores, and so forth), which further process the processed image data 416. Moreover, the motherboard 419 may include a memory 424.

As an example, in accordance with some implementations, the memory 424 may be a non-transitory memory that may store image data and data that represents machine executable instructions, or "software." In this manner, the processor 420 may, for example, execute instructions that are stored in the memory 424 for purposes of performing one or multiple techniques that are described herein. The memory 424 may be formed from volatile and/or non-volatile memory devices, such as semiconductor-based storage devices; magnetic-based storage devices, optical storage-based devices, memristor-based storage devices, phase change memory-based storage devices; volatile memory devices; a combination of storage devices selected from these storage technologies; and so forth.

Among its other features, the motherboard 419 may include a power supply 428 (part of the motherboard 419) that provides power supply rail voltages 430 to components of the electronic device 100.

In accordance with example implementations, the electronic device 100 may include an LED printed circuit board (PCB), or LED board 450. The LED board 450 may include the LED 250 along with an LED driver 434. The LED driver 434 may, for example, receive one of the supply rail voltages 430. Moreover, the LED driver 434 may, in accordance with example implementations, provide LED power to turn on the LED 250 in response to a switch 472 on a button PCB, or board button 470 being activated. For example, in accordance with some implementations, the switch 472 may be a momentary, or push button switch, which may be operated by depressing the button 114 (FIG. 1) or other button or key of the electronic device 100. In this manner, the button board 470 may provide a button state signal 473, whose voltage level depends on whether the switch 472 is connected to a supply voltage 471. By depressing the button 114, the button state signal 473 changes states; and the LED driver 434 may toggle the on/off state of the LED 250 in response to the button 114 being depressed and released. In accordance with further example implementations, the switch 472 may be a virtual switch that may be, for example, activated by a user interacting with a graphical user interface (GUI) of the electronic device.

Figure 5:
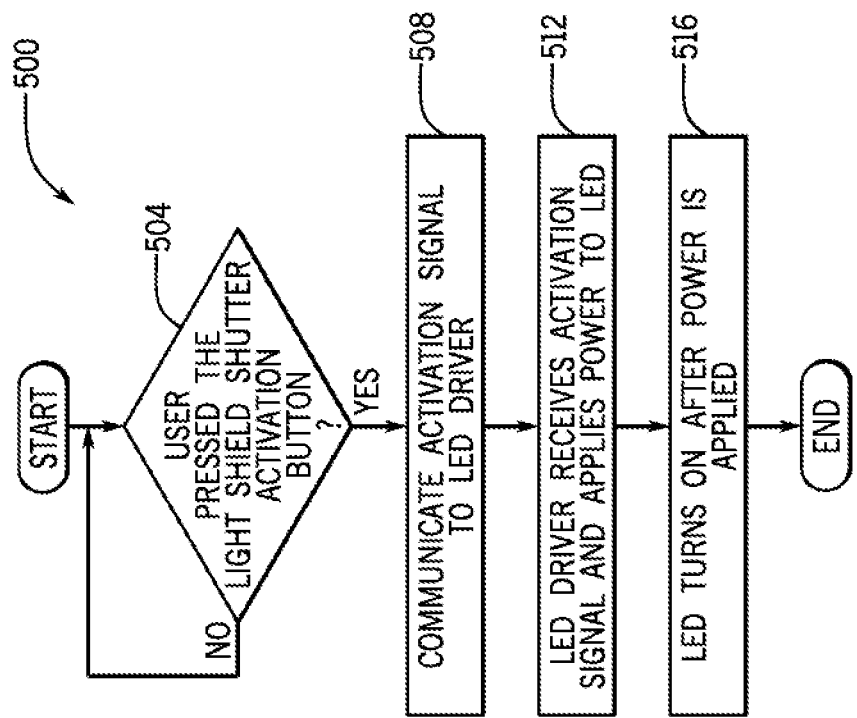
FIG. 5 is a flow diagram depicting a technique to activate a light shield shutter for a camera according to an example implementation.

Referring to FIG. 5, in accordance with example implementations, a technique 500 may be used to activate the light shield shutter. Pursuant to the technique 500, a determination may be made (decision block 504) whether the user has pressed a light shield shutter activation button (pressed a toggle button, for example). In accordance with some implementations, decision block 504 may be performed by a hardware circuit, such as a mechanical switch or may be provided by a processor executing software. In accordance with some implementations, the switch may communicate (block 508) an activation signal to an LED driver, and the LED driver may receive the activation signal and apply power to the LED of the light shield shutter, pursuant to block 512. The technique 500 includes turning on the LED after power is applied, pursuant to block 516.

Figure 6:
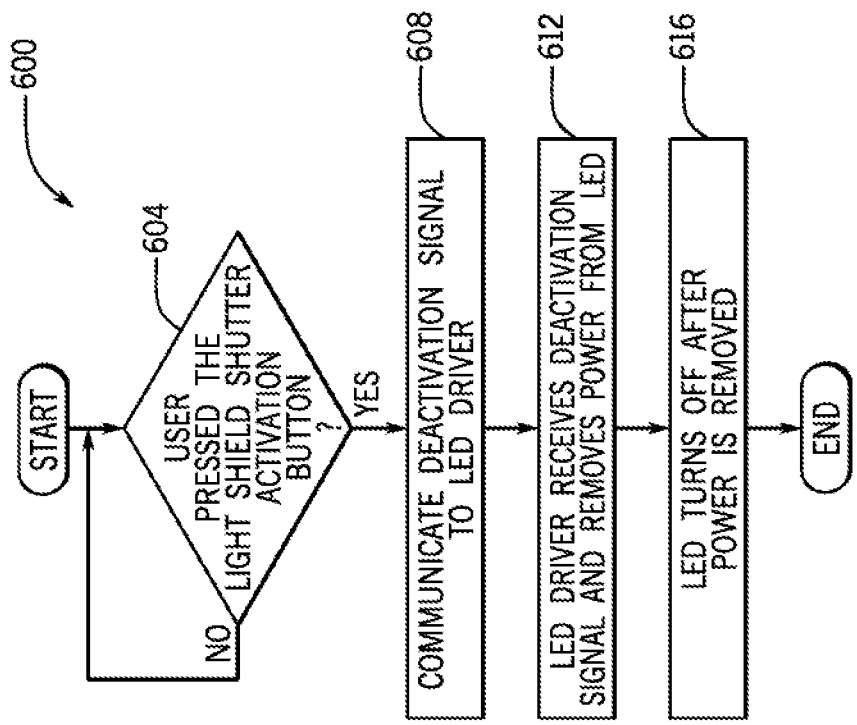
FIG. 6 is a flow diagram depicting a technique to deactivate a light shield shutter for a camera according to an example implementation.

In accordance with some implementations, a technique 600 that is depicted in FIG. 6 may be used for purposes of deactivating the light shield shutter. Pursuant to the technique 600, a determination is made (decision block 604) whether the user has pressed the light shield shutter activation button (pressed a toggle button, for example), and if so, a deactivation signal is communicated to the LED driver, pursuant to block 608. The LED driver receives the deactivation signal and removes power from the LED, pursuant to block 612; and then the LED turns off after power is removed, pursuant to block 616.

Figure 7:
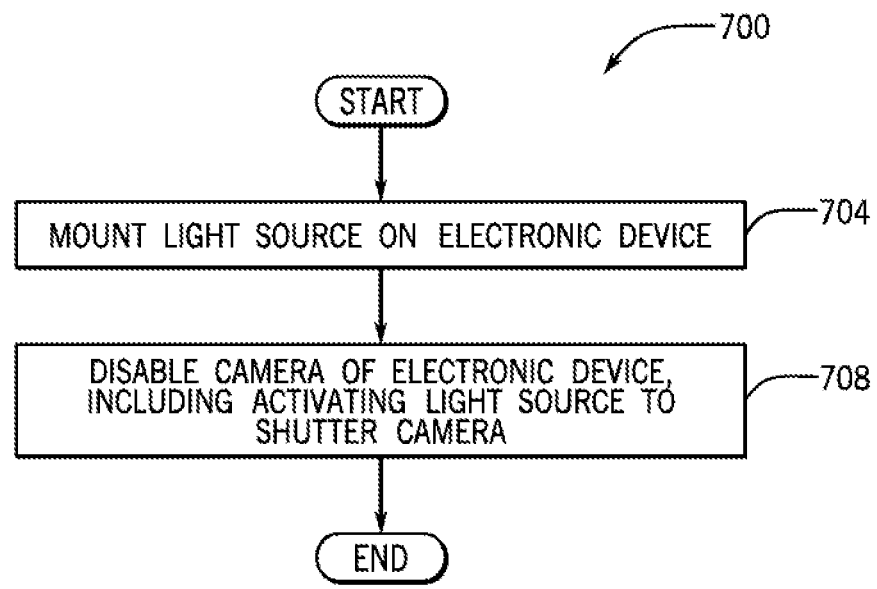
FIG. 7 is a flow diagram depicting a technique to provide a light shield shutter for a camera of an electronic device according to example implementations.
Figure 8:
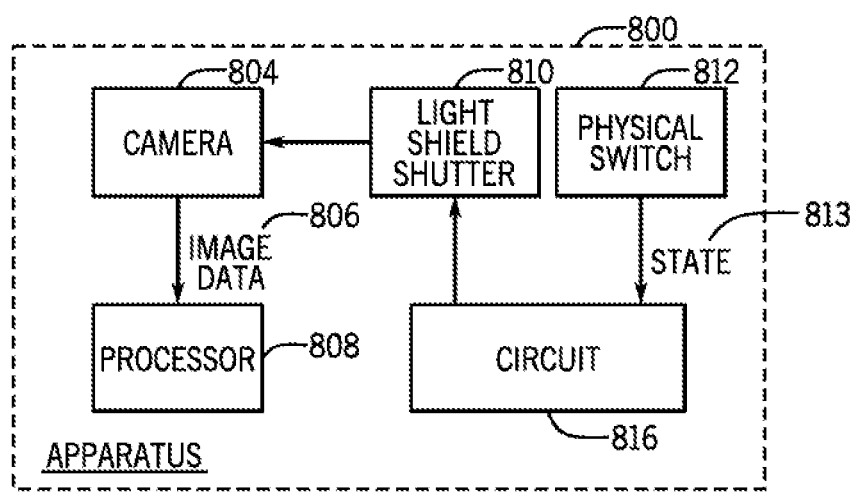
FIGS. 8 and 9 are schematic diagrams of an apparatus to provide a light shield shutter for a camera of an electronic device according to example implementations.
Figure 9:
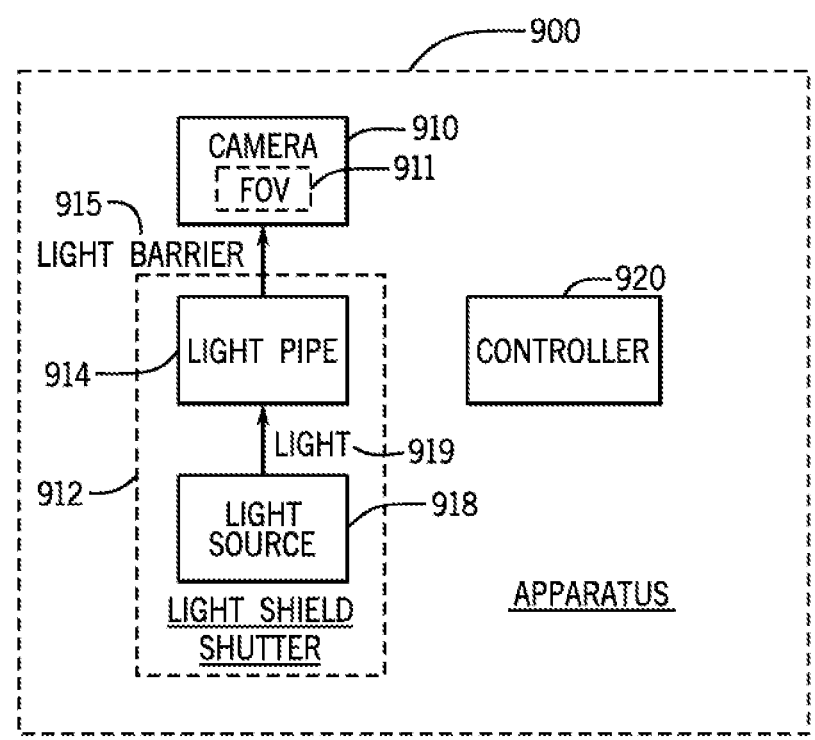

Thus, referring to FIG. 7, in accordance with example implementations, a technique 700 to provide a light shield shutter for an electronic device includes mounting (block 704) a light source on the electronic device and disabling (block 708) a camera of the electronic device, including activating a light source to shutter the camera.

In accordance with example implementations, an apparatus 800 includes a camera 804 to provide image data 806 representing images that are acquired by the camera 804. The apparatus 800 includes a processor 808 to process the image data 806; a light shield shutter 810 for the camera 804; a physical switch 812; and a circuit 816. The circuit 816 operates the light shield shutter 810 based on a state 813 of the physical switch 812.

In accordance with example implementations, an apparatus 900 includes a camera 910 that has a field of view 911 and a light shield shutter 912. The light shield shutter 912 includes a light source 918 and a light pipe 914. The light pipe 914 directs light provided by the light source 919 to form a light barrier 915 to prevent the camera 910 from acquiring an image associated with the field of view 911. The apparatus 900 includes a controller 920 to turn on the light source 918 to activate the light shield shutter.

Figure 10:
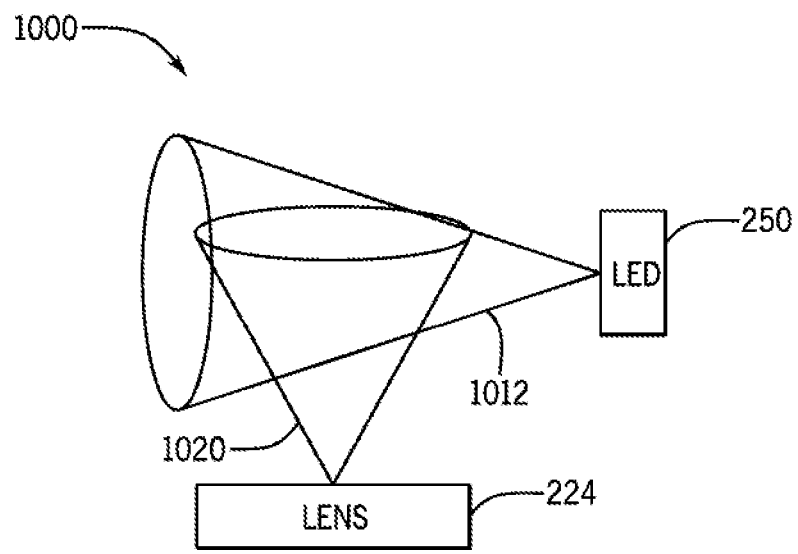
FIGS. 10 and 11 are illustrations of light shield shutters according to further example implementations.

Other implementations are contemplated, which are which within the scope of the appended claims. For example, in accordance with further example implementations, a light shield shutter 1000 that is depicted in FIG. 10 does not include a light pipe, or diffuser. In this manner, for the light shield shutter 1000, the LED 250 is oriented to produce light in a given direction such that an associated field of view 1012 of the light partially or fully (as depicted in FIG. 10) overlaps a corresponding field of view 1020 of the camera.

Figure 11:
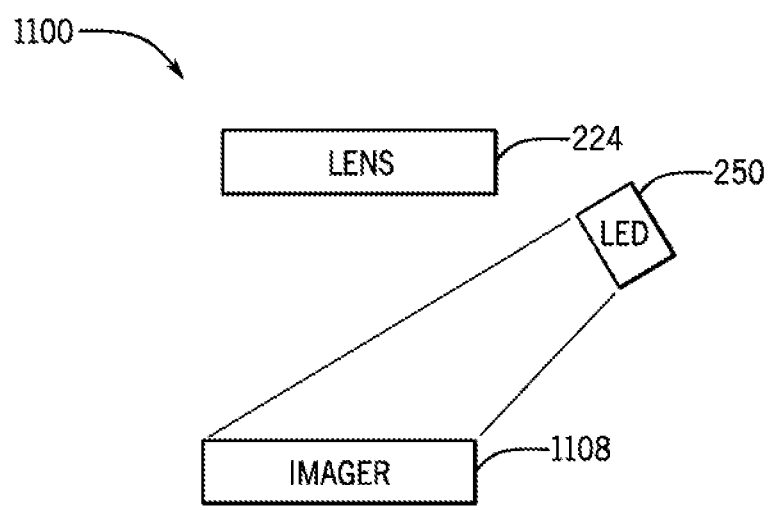

FIG. 11 depicts a light shield shutter 1100 that does not include alight pipe or diffuser, in accordance with further example implementations. The LED 250 is oriented in a direction to produce light directly on an image sensor, or imager 1108, of a camera. In this manner, the light produced by the LED 250, in accordance with these implementations, is directed behind the lens 224 of the camera toward the imager 1108.

While the present disclosure has been described with respect to a limited number of embodiments, those skilled in the art, having the benefit of this disclosure, will appreciate numerous modifications and variations therefrom. It is intended that the appended claims cover all such modifications and variations.

What is claimed is:
1. An apparatus comprising:
a camera having an associated field of view;
a light shield shutter comprising:
 a light source; and
 a light diffuser to diffuse light provided by the light source, the diffused light forming a light barrier that prevents the camera from acquiring an image associated with the field of view; and
a controller to turn on the light source to activate the light shield shutter.

2. The apparatus of claim 1, wherein the camera comprises a lens, and the apparatus further comprises a housing and an opening for the lens, wherein:
the light barrier extends across the opening for the lens, and
the camera and the light shield shutter are disposed within the housing.

3. The apparatus of claim 2, wherein:
the housing comprises a display window screen and a bezel disposed on a peripheral area of the display screen window,
the opening for the lens extends through the bezel, and
the light diffuser extends across the opening.

4. The apparatus of claim 2, wherein
the housing comprises a display window screen comprising a transparent region associated with the lens, and
the light diffuser extends across the transparent region.

5. The apparatus of claim 1, further comprising:
a printed circuit board (PCB),
wherein the light source comprises a light emitting diode (LED), and the LED, the controller and the camera are mounted to the PCB.

6. The apparatus of claim 1, further comprising a mechanical switch,
wherein the controller is to turn on the light source in response to a state of the mechanical switch.

7. The apparatus of claim 1, comprising an electronic device that includes a housing, wherein the camera, the light shield shutter, and the controller are housed by the housing.

8. The apparatus of claim 7, wherein the housing comprises an opening, and the light diffuser extends across the opening and is between the opening and a lens of the camera.

9. The apparatus of claim 1, wherein the light diffuser comprises:
a first light pipe portion having an end to receive the light of the light source; and
a second light pipe portion that extends across a lens of the camera, wherein the second light pipe portion is angled with respect to the first light pipe portion and is to receive the light of the light source from the first light pipe portion.

10. A method comprising:
mounting a light source on an electronic device;
mounting a light diffuser that directs light from the light source toward a lens of a camera; and
mounting the camera on the electronic device, wherein the light source when activated disables the camera.

11. The method of claim 10, wherein mounting the light source on the electronic device comprises mounting the light source so that a field of view of the light source overlaps a field of view of the camera.

12. The method of claim 10, wherein the electronic device includes a housing, the method comprising:
arranging the camera, the light source, and the light diffuser in the housing.

13. An electronic device comprising:
a camera to provide image data representing images acquired by the camera;
a processor to process the image data;
a light shield shutter for the camera, wherein the light shield shutter comprises a light source and a light diffuser to diffuse light from the light source, the diffused light forming a light barrier that prevents the camera from acquiring an image associated with a field of view of the camera;
a physical switch; and
a circuit to operate the light shield shutter based on a state of the physical switch.

14. The electronic device of claim 13, wherein the camera comprises a lens, and the light diffuser is to direct the light from the light source to the lens.

15. The electronic device of claim 13, wherein the circuit is to operate the light shield shutter independently of the processor.

16. The electronic device of claim 13, wherein:
the camera comprises an image sensor, and
the light from the light source saturates the image sensor in response to the light shield shutter being activated.

17. The electronic device of claim 13, wherein the light source comprises a light emitting diode (LED).

18. The electronic device of claim 13, further comprising a housing comprising an aperture for the camera, wherein the physical switch comprises a toggle switch and illumination of the aperture indicates that the light shield shutter is turned on.

19. The electronic device of claim 13, comprising a housing, wherein the camera, the light shield shutter, the processor, and the circuit are housed by the housing.

20. The electronic device of claim 13, wherein the light diffuser comprises:
a first light pipe portion having an end to receive the light of the light source; and
a second light pipe portion that extends across a lens of the camera, wherein the second light pipe portion is angled with respect to the first light pipe portion and is to receive the light of the light source from the first light pipe portion.

* * * * *